United States Patent

Sayama et al.

(10) Patent No.: US 9,595,282 B2
(45) Date of Patent: Mar. 14, 2017

(54) MAGNETIC RECORDING MEDIUM HAVING A $L1_0$-TYPE ORDERED ALLOY

(71) Applicant: HGST Netherlands B.V., Amsterdam (NL)

(72) Inventors: Junichi Sayama, Fujisawa (JP); Yoshiyuki Hirayama, Kokubunji (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/608,095

(22) Filed: Jan. 28, 2015

(65) Prior Publication Data

US 2016/0217816 A1 Jul. 28, 2016

(51) Int. Cl.
G11B 5/65 (2006.01)

(52) U.S. Cl.
CPC .................. *G11B 5/65* (2013.01)

(58) Field of Classification Search
None
See application file for complete search history.

(56) References Cited

U.S. PATENT DOCUMENTS

| | | | | |
|---|---|---|---|---|
| 7,960,044 | B2 * | 6/2011 | Albrecht | B82Y 10/00 360/135 |
| 8,081,542 | B1 * | 12/2011 | Grobis | B82Y 10/00 360/131 |
| 8,270,256 | B1 * | 9/2012 | Juang | G11B 5/012 369/13.01 |
| 8,941,950 | B2 * | 1/2015 | Yuan | G11B 5/65 360/135 |
| 2002/0041980 | A1 * | 4/2002 | Suzuki | G11B 5/65 428/826 |
| 2003/0049368 | A1 * | 3/2003 | Shimada | G11B 5/84 427/130 |
| 2007/0059561 | A1 * | 3/2007 | Uwazumi | G11B 5/656 428/832 |
| 2008/0068748 | A1 * | 3/2008 | Olson | G11B 5/02 360/110 |
| 2009/0138091 | A1 | 5/2009 | Ray | |
| 2010/0163521 | A1 * | 7/2010 | Balamane | G11B 5/314 216/22 |
| 2013/0028059 | A1 * | 1/2013 | Huang | G11B 5/314 369/13.17 |
| 2013/0028061 | A1 * | 1/2013 | Rosen | G11B 5/02 369/13.32 |
| 2013/0314815 | A1 * | 11/2013 | Yuan | G11B 5/65 360/59 |
| 2014/0103469 | A1 * | 4/2014 | Jan | H01L 43/10 257/421 |

OTHER PUBLICATIONS

Ray, C.D., U.S. Appl. No. 12/364,682, filed Feb. 3, 2009.

* cited by examiner

*Primary Examiner* — Will J Klimowicz
(74) *Attorney, Agent, or Firm* — Zilka-Kotab, PC

(57) ABSTRACT

According to one embodiment, a magnetic medium includes a substrate, and a magnetic recording layer positioned above the substrate, the magnetic recording layer including an ordered alloy having a $L1_0$-type structure, where the ordered alloy comprises a plurality of ferromagnetic crystal grains surrounded by non-magnetic grain boundaries, and where the ordered alloy comprises Fe, Ni and Pt.

17 Claims, 9 Drawing Sheets

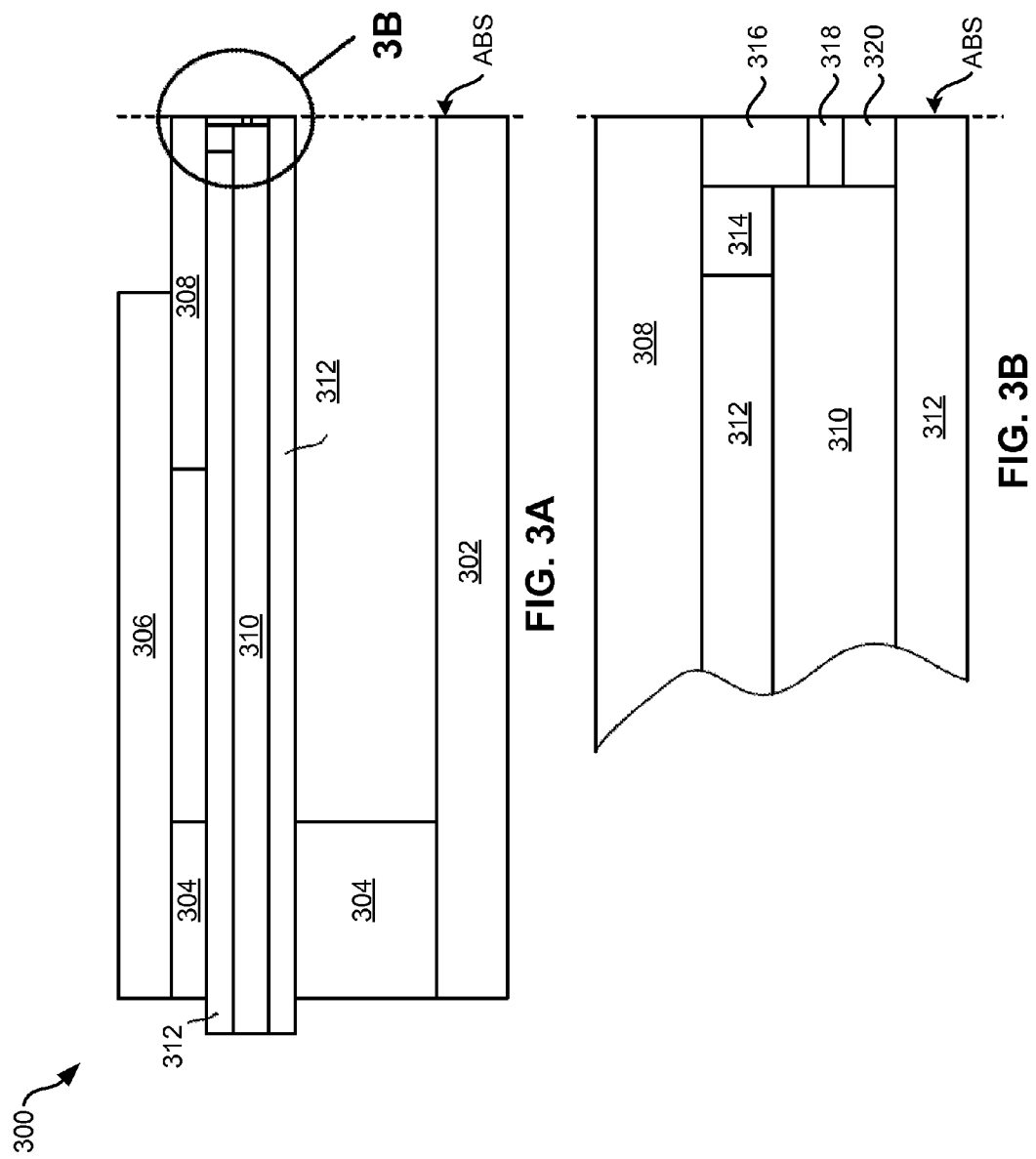

MAGNETIC RECORDING MEDIUM HAVING A L1₀-TYPE ORDERED ALLOY

FIELD OF THE INVENTION

The present invention relates to data storage systems, and more particularly, this invention relates to magnetic recording media having a $L1_0$-type ordered alloy therein.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. Accordingly, an important and ongoing goal involves increasing the amount of information able to be stored in the limited area and volume of HDDs. Increasing the areal recording density of HDDs provides one technical approach to achieve this goal. In particular, reducing the size of recording bits and components associated therewith offers an effective means to increase areal recording density. However, the continual push to miniaturize the recording bits and associated components presents its own set of challenges and obstacles. For instance, as the size of the ferromagnetic crystal grains in a magnetic recording layer become smaller and smaller, the crystal grains may become thermally unstable, such that thermal fluctuations result in magnetization reversal and the loss of recorded data. Increasing the magnetic anisotropy of the magnetic particles may improve the thermal stability thereof; however, an increase in the magnetic anisotropy requires an increase in the switching field needed to switch the magnetization of the magnetic particles during a write operation.

SUMMARY

According to one embodiment, a magnetic medium includes a substrate, and a magnetic recording layer positioned above the substrate, the magnetic recording layer including an ordered alloy having a $L1_0$-type structure, where the ordered alloy comprises a plurality of ferromagnetic crystal grains surrounded by non-magnetic grain boundaries, and where the ordered alloy comprises Fe, Ni and Pt.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a cross-sectional view of a perpendicular magnetic head with looped coils, according to one embodiment.

FIG. 3B is a cross-sectional view of a piggyback magnetic head with looped coils, according to one embodiment.

DETAILED DESCRIPTION

Figure 1:
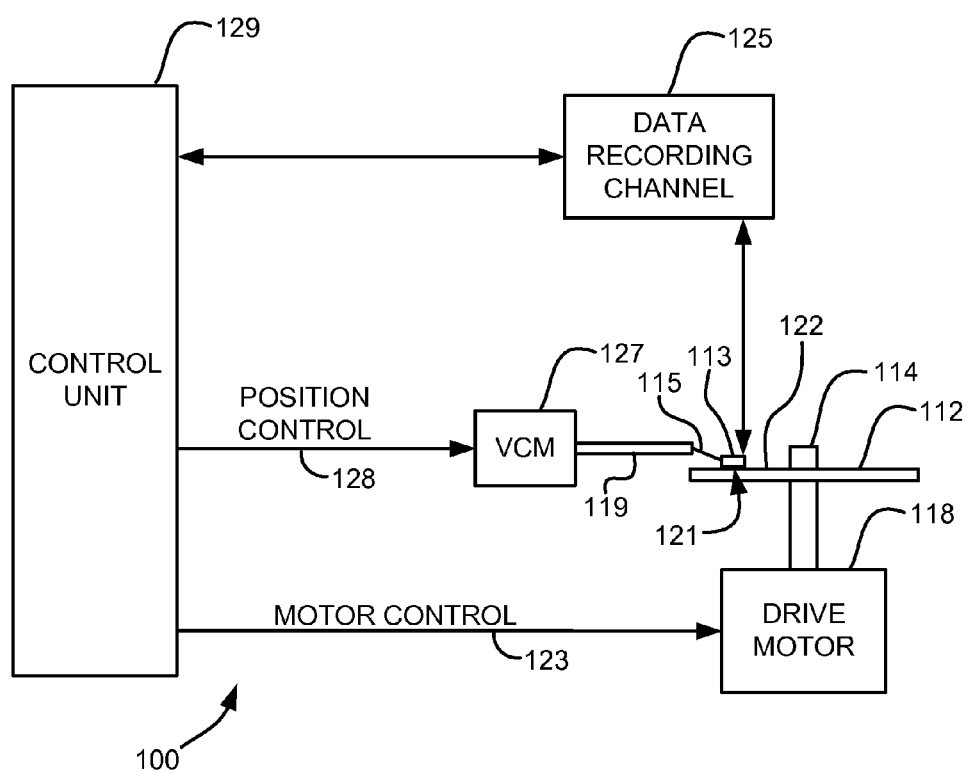
FIG. 1 is a simplified drawing of a magnetic recording disk drive system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm.

The following description discloses several preferred embodiments of disk-based storage systems and/or related systems and methods, as well as operation and/or component parts thereof.

A magnetic recording layer typically includes an assembly of ferromagnetic crystal grains, the magnetization orientation of which stores the recorded information. One approach to increase the recoding density of a magnetic recording layer may include reducing the average volume of the ferromagnetic crystal grains and/or separating the ferromagnetic crystal grains from one another via smaller non-magnetic grain boundaries. Unfortunately, reducing the volume of the crystal grains may affect their thermal stability. For example, thermal stability is given by: $K_u V/k_b T$, where $K_u$ denotes the magnetocrystalline anisotropy, V is the average grain volume, $k_b$ denotes the Boltzmann constant, and T denotes the temperature. Preferably, $K_u V/k_b T > \sim 60$ to avoid thermal decay. Accordingly, to compensate for the reduction in average volume, V, of the magnetic nanoparticles, the magnetic anisotropy ($K_u$) of the magnetic nanoparticles may be increased to maintain thermal stability. However, increasing the magnetic anisotropy also increases the coercivity of the ferromagnetic recording material, which may exceed the switching field (i.e., the write field) capability of the write head.

Heat assisted magnetic recording (HAMR), also referred to as thermally assisted magnetic recording, has emerged as a promising magnetic recording technique to address the difficulty in maintaining both the thermal stability and write-ability of the magnetic media. As the coercivity of the ferromagnetic recording material is temperature dependent, HAMR employs heat to lower the effective coercivity of a localized region of the magnetic media and write data therein. The data state becomes stored, or "fixed," upon cooling the magnetic media to ambient temperatures (i.e., normal operating temperatures typically in a range between about 15° C. and 60° C.). Heating the magnetic media may be accomplished by a number of techniques such as directing electromagnetic radiation (e.g. visible, infrared, ultraviolet light, etc.) onto the magnetic media surface via focused laser beams or near field optical sources. HAMR techniques may be applied to longitudinal and/or perpendicular recording systems, although the highest density storage systems are more likely to be perpendicular recording systems.

HAMR thus allows use of ferromagnetic recording materials with substantially higher magnetic anisotropy and smaller thermally stable grains as compared to conventional magnetic recording techniques. The use of such magnetic recording materials is possible with HAMR due to the localized heating of the magnetic media, as noted above. Typically, the magnetic media is heated to a temperature near or above its Curie point, the temperature at which the spontaneous magnetization of a ferromagnetic material disappears. Accordingly, ferromagnetic recording materials with a Curie point suitable for HAMR are preferred. In particular approaches implementing HAMR, ferromagnetic recording materials having a Curie point in a range between about 250° C. to about 400° C. may be preferred, but higher or lower temperatures may be used.

There may be several disadvantages associated with ferromagnetic recording materials having a Curie point above this range (e.g., above about 400° C.). For example, such ferromagnetic recording materials may be damaged when the media is heated to achieve this high Curie point during HAMR. There may also be no practical and/or available heating means that is able to be mounted in a recording head and that has the capacity to raise the temperature of the media to this high Curie point. Additionally, if a localized region of the magnetic media surface is heated to this high Curie point to facilitate writing therein, portions of the magnetic media adjacent to this localized region may also be subject to this intense heat, thus increasing the likelihood that the magnetization in these adjacent regions may be overwritten or erased (often referred to as write blurring). Finally, the intense heat (i.e., the heat needed to achieve this high Curie point) generated in and/or near the localized region of the magnetic media may not dissipate from said regions immediately following recording, which may increase the likelihood of thermal fluctuations and the loss of recorded data.

Likewise, there may be several disadvantages associated with ferromagnetic recording materials having a low Curie point (e.g., below about 250° C.). For example, for ferromagnetic materials with low Curie points, a marked change in the anisotropic magnetic field and the switching field may occur even at ambient temperatures. Such materials may thus not be thermally stable. Moreover, it is important to note that the plurality of ferromagnetic grains present in a magnetic recording layer may have different Curie points/temperatures. A large Curie point distribution may adversely affect the recording/reproducing characteristics of the magnetic recording medium.

As discussed previously, suppression of thermal fluctuations of magnetization in a magnetic recording layer requires use of ferromagnetic magnetic materials that possess a substantially high magnetic anisotropic constant. Co—Cr-based alloys have been hitherto employed as a magnetic recording layer material. However, Co—Cr-based alloys do not possess a magnetic anisotropic constant that is suitable (e.g. high enough) to achieve surface recording densities exceeding 1 Tbit/inch$^2$. Accordingly, to satisfy the continued push to increase the recording density of a magnetic recording medium, materials with higher magnetic anisotropic constants than a Co—Cr-based alloy must be employed.

For instance, one approach involves replacing conventional Co—Cr-based alloys with an ordered alloy including a transition metal element (e.g., Fe, Co, Ni, etc.) and noble metal element (e.g., Pt, Pd, etc.). Such an ordered alloy, which may also be referred to herein as a chemically ordered alloy, has a structure in which the different atoms therein are arranged in an ordered fashion (e.g., there is an ordered arrangement of the atoms among the atomic sites in the crystal lattice of the alloy). An ordered alloy including a transitional metal element and a noble metal element has a high magnetic anisotropy constant and is thus suitable for use in the magnetic recording layer of a high density magnetic recording medium.

The order parameter associated with an ordered alloy corresponds to the extent of ordering of the ordered alloy. In particular, the order parameter may express a ratio of the number of atoms that occupy the atomic sites in the crystal lattice of the ordered alloy compared to the number of atoms that occupy the atomic sites in the crystal lattice of an ideal crystal (i.e., a crystal having a perfectly ordered atomic arrangement with no impurities, imperfections, or other defects). The order parameter may be adversely affected by several factors including, but not limited to, the inadequate implementation of the heating process necessary for ordering, a lack of correspondence between the composition and the stoichiometric composition, etc.

To obtain an ordered alloy, a disordered-ordered phase transition (ordering) must occur by way of a heating treatment. In preferred approaches, ordered alloys may be generated in a thermal equilibrium state, which generally corresponds to the low-temperature phase. However, in various approaches where sputtering is used to manufacture the magnetic recording medium, said sputtering may include a vapor-phase quenching process that produces thin films in a non-equilibrium state. For example, in such a vapor-phase quenching process, the high-temperature phase will be instantaneously fixed and a disordered alloy will be preferentially generated until the required time for the atoms to adopt their most thermally stable arrangement has elapsed. Thus, in order to produce an ordered alloy using a sputtering method, the resulting disordered alloy must be subjected to a heat treatment or fabricated on a substrate that has been pre-heated to a high temperature such that atomic diffusion and rearrangement are facilitated by the heat energy of the substrate.

In practice, ordered alloys cannot be formed with a perfectly ordered structure, that is to say, they cannot be formed as a disturbance-free structure in which the atoms are arranged in a perfectly ordered fashion. Even ordered alloys which possess a high magnetic anisotropic constant and a substantially ordered structure may comprise microscopic sections of disorder.

One example of an ordered alloy having a particularly high magnetic anisotropic constant, and thus particularly suitable for the material of a magnetic recording layer, is a $L1_0$-type Fe—Pt ordered alloy. The c-axis of a $L1_0$-type Fe—Pt ordered alloy is the easy axis f magnetization and is oriented perpendicular to each atomic layer. As such, formation of a thin film comprising a $L1_0$-type Fe—Pt ordered alloy, which has its [001] axis perpendicular to the film surface, is particularly suitable for use in a perpendicular magnetic recording medium. However, an alloy consisting of equiatomic Fe and Pt that does not possess an ordered arrangement of atoms (i.e., a disordered alloy) does not exhibit magnetocrystalline anisotropy. Satisfactory ordering of an $L1_0$-type Fe—Pt ordered alloy requires a heat treatment in excess of about 600° C. $L1_0$-type Fe—Pt ordered alloys are described in U.S. patent application Ser. No. 12/364,682, which is herein incorporated for reference with respect to the exemplary descriptions of the structural characteristics and methods of making/using said alloys.

As also discussed previously, the magnitude of the switching field (i.e., the magnetic field required to switch the magnetization of a magnetic recording layer) is heavily influenced by the magnitude of the magnetic anisotropic constant of the magnetic recording material. For instance, in approaches where a magnetic recording layer includes a material with a very high magnetic anisotropic constant, such as an $L1_0$-type Fe—Pt ordered alloy, a commensurately high switching field may be needed to switch the magnetization thereof. However, conventional magnetic recording heads may not be able to the produce the high switching field needed to switch the magnetization in materials having very high magnetic anisotropies. Again, this problem may be mitigated by use of HAMR, where the magnetic recording material is heated locally to temperatures near or exceeding its Curie temperature in order to lower the coercivity enough for writing to occur. Accordingly, HAMR allows use of magnetic recording materials, such as an $L1_0$-type Fe—Pt ordered alloy, which include small, thermally stable ferromagnetic grains with high magnetic anisotropy.

The magnetization switching phenomenon of the magnetic recording layer appears as an aggregation of the magnetization-switched ferromagnetic crystal grains present within the magnetic recording layer. Generally, each of these ferromagnetic crystal grains do not switch from one magnetization state to another at exactly the same switching field. This variation in the switching field is referred to as the switching field distribution (SFD). A large SFD is known to have an undesirable effect on the recording/reproducing characteristics of a magnetic recording medium.

The magnetic recording characteristics associated with a magnetic recording layer are greatly affected by the composition and/or order parameter of an ordered alloy present therein. For instance, fluctuations in the composition and/or order parameter of an ordered alloy, such as a $L1_0$-type Fe—Pt ordered alloy, result in a marked increase in the SFD and the Curie point distribution associated with the ferromagnetic crystal grains. This problem (e.g., an increased SFD and Curie point distribution) may be particularly evident for granular magnetic media where the ferromagnetic crystal grains are separated from each other by non-magnetic grain boundaries because the individual ferromagnetic crystal grains behave magnetically independently, and the SFD and the Curie point distribution are not averaged. In addition, the greater the reduction in the size of the ferromagnetic crystal grains, the greater the effects of the fluctuations in the microscopic composition and order parameter thereof, which may lead to further increases in the SFD and Curie point distribution.

In sum, increasing the recording density of a magnetic recording medium is possible by reducing the size and/or granulating thermally stable ferromagnetic grains having a high magnetic anisotropy. Magnetic recording technologies, such as HAMR, are particularly suited for magnetic recording media with high magnetic anisotropy. However, reducing and/or isolating (granulating) the ferromagnetic grains may nevertheless lead to fluctuations in the composition and/or order parameter thereof, which, in turn, may lead to an increased SFD and Curie point distribution. Accordingly, even with the use of recording technologies such as HAMR, increasing the recording density of a magnetic medium via reducing the size and/or granulating (isolating) the ferromagnetic grains may not be effective absent the ability to manage and/or reduce the SFD and Curie point distribution associated with small ferromagnetic grains.

Embodiments described herein overcome the aforementioned drawbacks by providing a granular magnetic recording layer including a $L1_0$-type Fe—Ni—Pt ordered alloy, where the plurality of ferromagnetic grains (e.g., Fe, Ni and Pt) present in said ordered alloy are surrounded by non-magnetic grain boundaries. The $L1_0$-type Fe—Ni—Pt ordered alloys disclosed herein exhibit significantly less fluctuations in composition and order parameter and thus a reduced SFD and Curie point distribution, as compared to existing ordered alloys (e.g., $L1_0$-type Fe—Pt ordered alloys). Accordingly, provision of magnetic recording layers with a $L1_0$-type Fe—Ni—Pt ordered alloy therein may lead to increased recording densities.

Following are several examples of general and specific embodiments relating to the use, manufacture, structure, properties, etc. of granular magnetic recording layers including a $L1_0$-type Fe—Ni—Pt ordered alloy.

For instance, in one general embodiment, a magnetic medium includes a substrate, and a magnetic recording layer positioned above the substrate, the magnetic recording layer including an ordered alloy having a $L1_0$-type structure, where the ordered alloy comprises a plurality of ferromagnetic crystal grains surrounded by non-magnetic grain boundaries, and where the ordered alloy comprises Fe, Ni and Pt.

Referring now to FIG. 1, a disk drive 100 is shown in accordance with one embodiment. As an option, the disk drive 100 may be implemented in conjunction with features from any other embodiment listed herein, such as those described with reference to the other FIGS. Of course, the disk drive 100 and others presented herein may be used in various applications and/or in permutations which may or may not be specifically described in the illustrative embodiments listed herein.

As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112.

Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
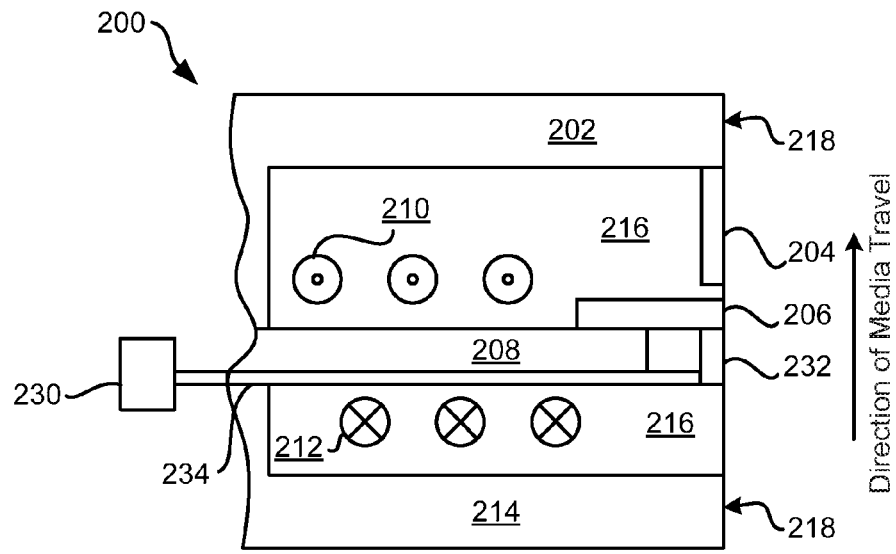
FIG. 2A is a cross-sectional view of a perpendicular magnetic head with helical coils, according to one embodiment.
Figure 2B:
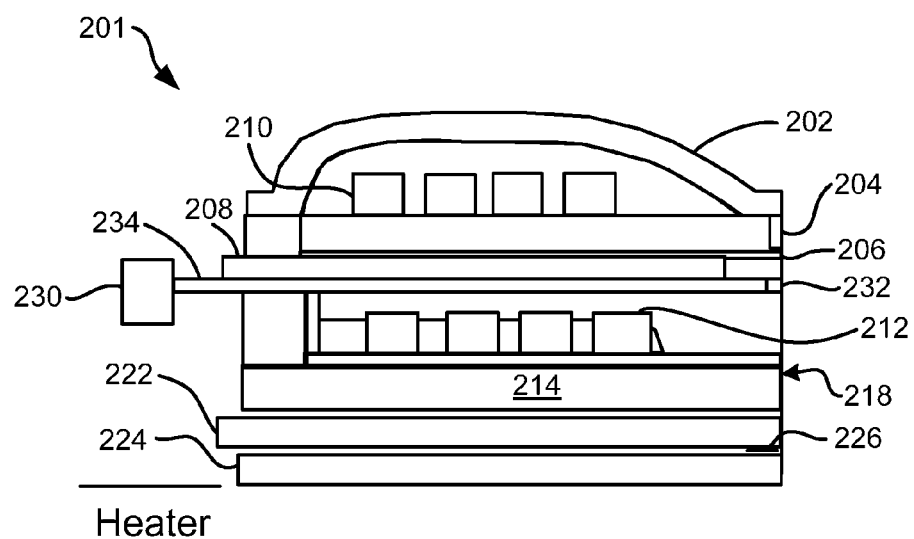
FIG. 2B is a cross-sectional view a piggyback magnetic head with helical coils, according to one embodiment.

FIGS. 2A and 2B provide cross-sectional views of a magnetic head 200 and a piggyback magnetic head 201, according to various embodiments. As an option, the magnetic heads 200, 201 may be implemented in conjunction with features from any other embodiment listed herein, such as those described with reference to the other FIGS. Of course, the magnetic heads 200, 201 and others presented herein may be used in various applications and/or in permutations which may or may not be specifically described in the illustrative embodiments listed herein.

As shown in the magnetic head 200 of FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

In various optional approaches, the magnetic head 200 may be configured for heat assisted magnetic recording (HAMR). Accordingly, for HAMR operation, the magnetic head 200 may include a heating mechanism of any known type to heat the magnetic medium (not shown). For instance, as shown in FIG. 2A according to one in one particular approach, the magnetic head 200 may include a light source 230 (e.g., a laser) that illuminates a near field transducer 232 of known type via a waveguide 234.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

An optional heater is shown in FIG. 2B near the non-ABS side of the piggyback magnetic head 201. A heater (Heater) may also be included in the magnetic head 200 of FIG. 2A. The position of this heater may vary based on design parameters such as where the protrusion is desired, coefficients of thermal expansion of the surrounding layers, etc.

Moreover, in various optional approaches, the piggyback magnetic head 201 may also be configured for heat assisted magnetic recording (HAMR). Thus, for HAMR operation, the magnetic head 200 may additionally include a light source 230 (e.g., a laser) that illuminates a near field transducer 232 of known type via a waveguide 234.

Referring now to FIG. 3A, a partial cross section view of a system 300 having a thin film perpendicular write head design incorporating an integrated aperture near field optical source (e.g., for HAMR operation) is shown according to one embodiment. As an option, this system 300 may be implemented in conjunction with features from any other embodiment listed herein, such as those described with reference to the other FIGS. Of course, such a system 300 and others presented herein may be used in various applications and/or in permutations which may or may not be specifically described in the illustrative embodiments listed herein. Moreover, in order to simplify and clarify the general structure and configuration of the system 300, spacing layers, insulating layers, and write coil layers may be omitted from FIG. 3.

As shown in FIG. 3A, the write head has a lower return pole layer 302, back-gap layer(s) 304, upper return pole layer 306, and upper pole tip layer 308. In one approach, the lower return pole layer 302 may also have a lower pole tip (not shown) at the ABS. Layer 310 is an optical waveguide core, which may be used while conducting HAMR, e.g., to guide light from a light source to heat a medium (not shown) at the ABS when the system 300 is writing thereto. According to a preferred approach, the optical waveguide core is surrounded by cladding layers 312. Moreover, layers 310 and 312 may extend through at least a portion of back-gap layer(s) 304. The components inside of Circle 3B are shown in an expanded view in FIG. 3B, as discussed in further detail below.

Layer 310 may be comprised of a suitable light transmitting material, as would be known by one of reasonable skill in the relevant art. Exemplary materials include $Ta_2O_5$, and/or $TiO_2$. As shown, the core layer 310 has approximately uniform cross section along its length. As well known in the art, the optical waveguide can have a number of other possible designs including a planar solid immersion mirror or planar solid immersion lens which have a non-uniform core cross section along the waveguide's length.

In various approaches, coil layers (not shown) and various insulating and spacer layers (not shown) might reside in the cavity bounded by the ABS, back-gap(s) 304, lower return pole 302, and/or upper bounding layers 306, 308, and 312 as would be recognized by those of skill in the art. Layers 302, 304, 306, and 308 may be comprised of a suitable magnetic alloy or material, as would be known by one of reasonable skill in the relevant art. Exemplary materials include Co, Fe, Ni, Cr and combinations thereof.

As described above, FIG. 3B is a partial cross section expanded view of detail 3B in FIG. 3A, in accordance with one embodiment. Pole lip 316 is magnetically coupled to upper pole tip layer 308, and to optional magnetic step layer 314. Aperture 318 (also known as a ridge aperture), surrounding metal layer 320, and pole lip 316 comprise the near field aperture optical source (or near field transducer), which is supplied optical energy via optical waveguide core 310. Pole lip 316 and optional magnetic step layer 314 may be comprised of a suitable magnetic alloy, such as Co, Fe, Ni, Cr and/or combinations thereof. Metal layer 320 may be comprised of Cu, Au, Ag, and/or alloys thereof, etc.

With continued reference to FIG. 3B, cladding layer 312 thickness may be nominally about 300 nm, but may be thicker or thinner depending on the dimensions of other layers in the structure. Optional magnetic step layer 314 may have a nominal thickness (the dimension between layers 308 and 310) of about 300 nm, and a nominal depth (as measured from layer 316 to layer 312) of about 180 nm. Pole lip 316 may have a nominal depth (as measured from the ABS) approximately equal to that of layer 320, with the value being determined by the performance and properties of the near field optical source (see examples below). The thickness of the pole lip 316 can vary from about 150 nm (with the optional magnetic step layer 314) to about 1 micron, preferably between about 250 nm and about 350 nm. The thickness of optical waveguide core layer 310 may be nominally between about 200 nm and about 400 nm, sufficient to cover the thickness of the aperture 318. In the structure shown in FIG. 3B, the layer 308 extends to the ABS. In some preferred embodiments, the layer 308 may be recessed from the ABS while maintaining magnetic coupling with the layers 314 and 316.

Figure 4A:
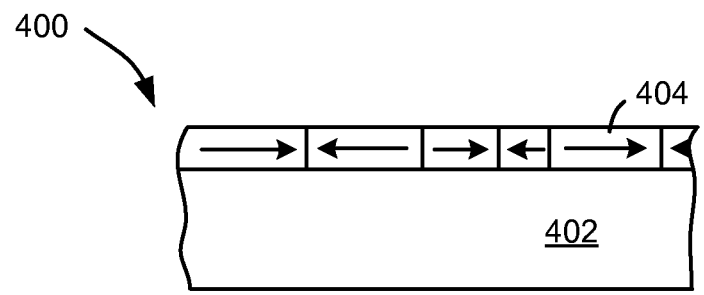
FIG. 4A is a schematic representation of a section of a longitudinal recording medium, according to one embodiment.

FIG. 4A provides a schematic illustration of a longitudinal recording medium 400 typically used with magnetic disc recording systems, such as that shown in FIG. 1. This longitudinal recording medium 400 is utilized for recording magnetic impulses in (or parallel to) the plane of the medium itself. This longitudinal recording medium 400, which may be a recording disc in various approaches, comprises at least a supporting substrate 402 of a suitable non-magnetic material such as glass, and a conventional magnetic recording layer 404 positioned above the substrate.

Figure 4B:
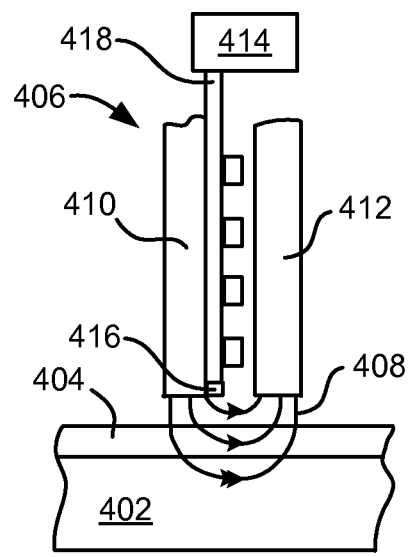
FIG. 4B is a schematic representation of a magnetic recording head and the longitudinal recording medium of FIG. 4A, according to one embodiment.

FIG. 4B shows the operative relationship between a recording/playback head 406, which may preferably be a thin film head and/or other suitable head as would be recognized by one having skill in the art upon reading the present disclosure, and the longitudinal recording medium 400 of FIG. 4A. As shown in FIG. 4B, the magnetic flux 408, which extends between the main pole 410 and return pole 412 of the recording/playback head 406, loops into and out of the magnetic recording layer 404.

In various optional approaches, the recording/playback head 406 may additionally be configured for heat assisted magnetic recording (HAMR). Accordingly, for HAMR operation, the recording/playback head 406 may include a heating mechanism of any known type to heat, and thus lower the effective coercivity, of a localized region on the magnetic medium 400 surface in the vicinity of the main pole 410. For instance, as shown in FIG. 4B, a light source 414 such as a laser illuminates a near field transducer 416 of known type via a waveguide 418.

Figure 5A:
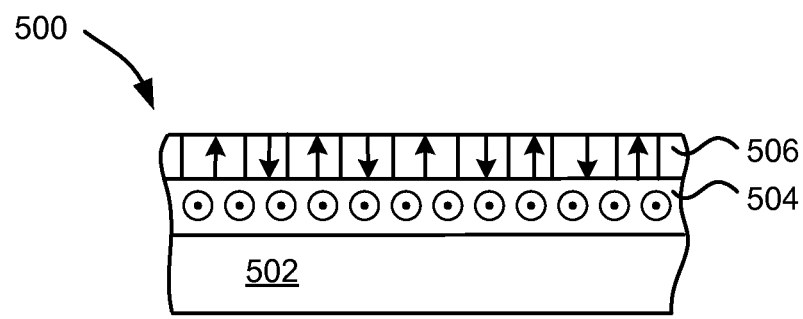
FIG. 5A is a schematic representation of a perpendicular recording medium, according to one embodiment.

Improvements in longitudinal recording media have been limited due to issues associated with thermal stability and recording field strength. Accordingly, pursuant to the current push to increase the areal recording density of recording media, perpendicular recording media (PMR) has been developed and found to be superior to longitudinal recording media. FIG. 5A provides a schematic diagram of a simplified perpendicular recording medium 500, which may also be used with magnetic disc recording systems, such as that shown in FIG. 1. As shown in FIG. 5A, the perpendicular recording medium 500, which may be a recording disc in various approaches, comprises at least a supporting substrate 502 of a suitable non-magnetic material (e.g., glass, aluminum, etc.), and a soft magnetic underlayer 504 of a material having a high magnetic permeability positioned above the substrate 502. The perpendicular recording medium 500 also includes a magnetic recording layer 506 positioned above the soft magnetic underlayer 504, where the magnetic recording layer 506 preferably has a high coercivity relative to the soft magnetic underlayer 504. There may be several additional layers present, such as an "exchange-break" layer or "interlayer" (not shown) between the soft magnetic underlayer 504 and the magnetic recording layer 506.

The orientation of magnetic impulses in the magnetic recording layer 506 is substantially perpendicular to the surface of the recording layer. The magnetization of the soft magnetic underlayer 504 is oriented in (or parallel to) the plane of the soft magnetic underlayer 504. As particularly shown in FIG. 5A, the in-plane magnetization of the soft magnetic underlayer 504 may be represented by an arrow extending into the paper.

Figure 5B:
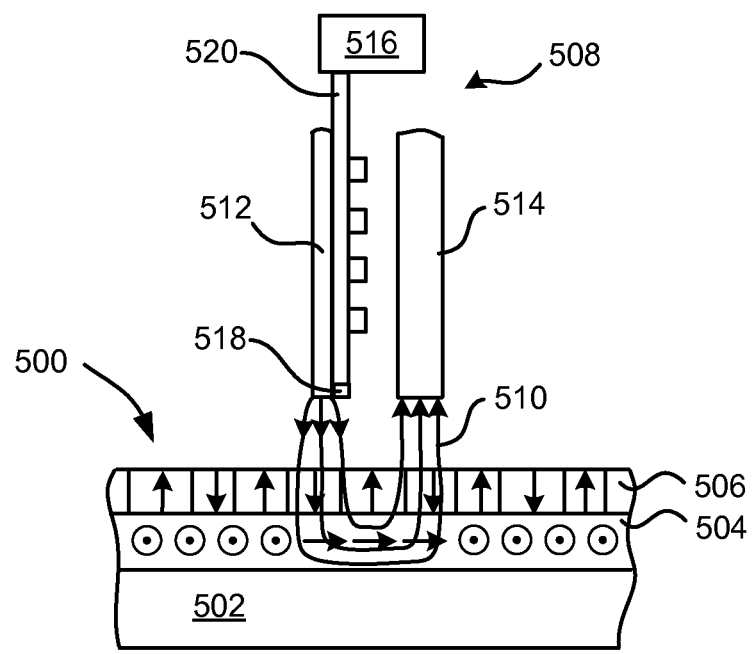
FIG. 5B is a schematic representation of a recording head and the perpendicular recording medium of FIG. 5A, according to one embodiment.

FIG. 5B illustrates the operative relationship between a perpendicular head 508 and the perpendicular recording medium 500 of in FIG. 5A. As shown in FIG. 5B, the magnetic flux 510, which extends between the main pole 512 and return pole 514 of the perpendicular head 508, loops into and out of the magnetic recording layer 506 and soft magnetic underlayer 504. The soft magnetic underlayer 504 helps focus the magnetic flux 510 from the perpendicular head 508 into the magnetic recording layer 506 in a direction generally perpendicular to the surface of the magnetic medium 500. Accordingly, the intense magnetic field generated between the perpendicular head 508 and the soft magnetic underlayer 504, enables information to be recorded in the magnetic recording layer 506. The magnetic flux is further channeled by the soft magnetic underlayer 504 back to the return pole 514 of the head 508.

As noted above, the magnetization of the soft magnetic underlayer 504 is oriented in (parallel to) the plane of the soft magnetic underlayer 504, and may represented by an arrow extending into the paper. However, as shown in FIG. 5B, this in plane magnetization of the soft magnetic underlayer 504 may rotate in regions that are exposed to the magnetic flux 510.

It should be again noted that in various approaches, the perpendicular head 508 may be configured for heat assisted magnetic recording (HAMR). Accordingly, for HAMR operation, the perpendicular head 508 may include a heating mechanism of any known type to heat, and thus lower the effective coercivity of, a localized region on the magnetic media surface in the vicinity of the main pole 518. For instance, as shown in FIG. 5B, a light source 516 such as a laser illuminates a near field transducer 518 of known type via a waveguide 520.

Except as otherwise described herein with reference to the various inventive embodiments, the various components of the structures of FIGS. 1-5B, and of other embodiments described herein, may be of conventional materials and design, and fabricated using conventional techniques, as would be understood by one skilled in the art upon reading the present disclosure.

Figure 6:
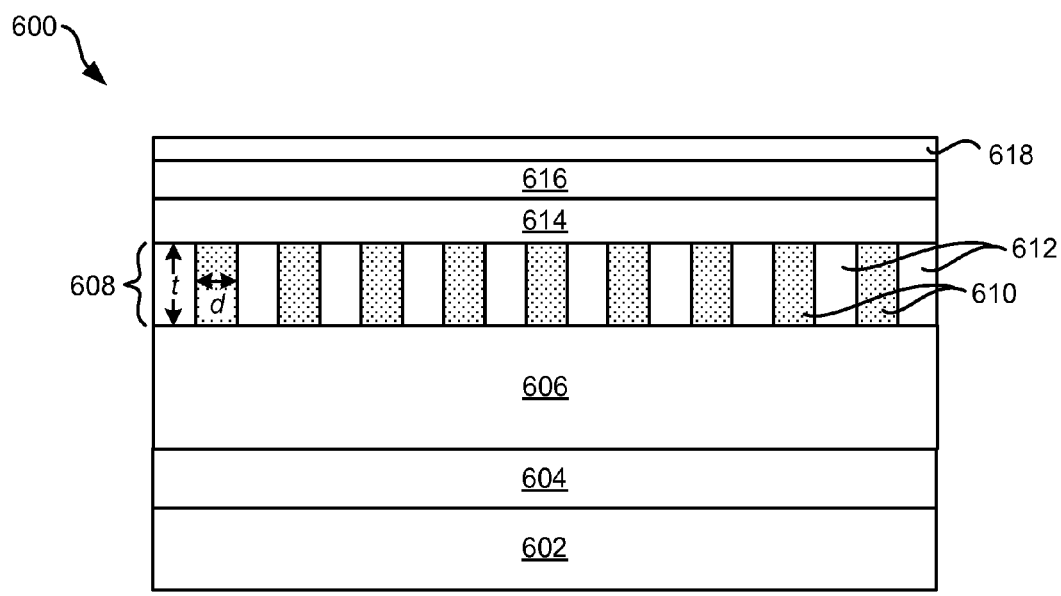
FIG. 6 is a schematic representation of a magnetic medium, according to one embodiment.

Referring now to FIG. 6, a magnetic medium 600 is shown according to one embodiment. As an option, the magnetic medium 600 may be implemented in conjunction with features from any other embodiment listed herein, such as those described with reference to the other FIGS. Of course, the magnetic medium 600, and others presented herein may be used in various applications and/or in permutations which may or may not be specifically described in the illustrative embodiments listed herein. For instance, various embodiments of the magnetic medium 600 may include more or less layers than those shown in FIG. 6. Further, the magnetic medium 600 and others presented herein may be used in any desired environment.

As shown in FIG. 6, the magnetic recording medium 600 includes a substrate layer 602 comprising a material of high rigidity, such as glass, Al, $Al_2O_3$, MgO, Si, or other suitable substrate material as would be understood by one having skill in the art upon reading the present disclosure. In preferred approaches, the substrate layer 602 includes a material that allows media deposition at elevated temperatures, e.g., on the order of about 600-800° C., but could be higher or lower in various approaches.

An adhesion layer 604 is present above the substrate layer 602. In various approaches, the adhesion layer 604 may comprise Ta, Ti, and/or alloys thereof. In preferred approaches, the adhesion layer 604 comprises an amorphous material that does not affect the crystal orientation of the layers deposited thereon.

While not shown in FIG. 6, an optional soft magnetic underlayer may be positioned between the adhesion layer 604 and the orientation controlling intermediate layer 606. This soft magnetic underlayer may be configured to promote data recording in the magnetic recording layer 608. Accordingly, in preferred approaches, this soft magnetic underlayer may include a material having a high magnetic permeability. Suitable materials for the soft magnetic underlayer may include, but are not limited to, Fe, FeNi, FeCo, a Fe-based alloy, a FeNi-based alloy, a FeCo-based alloy, Co-based ferromagnetic alloys, and combinations thereof. In some approaches, this soft magnetic underlayer may include a single layer structure or a multilayer structure. For instance, one example of a multilayer soft magnetic underlayer structure may include a coupling layer (e.g., including Ru) sandwiched between one or more soft magnetic underlayers, where the coupling layer is configured to induce an antiferromagnetic coupling between one or more soft magnetic underlayers.

The magnetic medium 600 may also include a heat-absorbing (heat sink) layer (also not shown in FIG. 6) positioned between the adhesion layer 604 and the orientation controlling intermediate layer 606. A heat sink layer including a material having a high thermal conductivity (e.g., greater than 30 W/m-K, preferably greater than 100 W/m-K) may be particularly useful for HAMR purposes. In various approaches, this heat-absorbing layer may be a plasmonic layer. Suitable materials for the heat-absorbing layer may include, but are not limited to Ta, Ti, cu, g, Pt, Au and alloys thereof.

It is important to note that in some approaches the magnetic medium 600 may include a soft magnetic underlayer and/or a heat-absorbing layer, both of which may be positioned between the adhesion layer 604 and the orientation controlling intermediate layer 606. In approaches where both a soft magnetic underlayer and a soft heat-absorbing layer are present, the soft magnetic underlayer may be positioned above or below the heat-absorbing layer, as equivalent effects may be provided regardless of the position of the soft magnetic underlayer relative to the heat-absorbing layer.

As shown in FIG. 6, an orientation controlling intermediate layer 606 is present above the adhesion layer 604 (and any soft underlayers and/or heat absorbing layers if present). The orientation controlling intermediate layer 606 may be configured to control the crystal orientation and the grain separation in the magnetic recording layer 608. For instance, the orientation controlling intermediate layer 606 may be configured to control the crystal orientation of a $L1_0$-type Fe—Pt or Fe—Ni—Pt ordered alloy present within the magnetic recording layer 608, where the [001] axis (the easy axis of magnetization) of both alloys are ideally oriented perpendicular to the upper surface of the magnetic recording layer.

In some approaches, the orientation controlling intermediate layer 606 may include MgO. In other approaches, the orientation controlling intermediate layer 606 may include one or more cubic crystal compounds including but not limited to $SrTiO_3$, indium tin oxide (ITO), MnO, TiN, RuAl, etc., and/or alloys thereof. In more approaches, the orientation controlling intermediate layer 606 may include one or more body-centered cubic structure metals including but not limited to Cr, Mo, W, etc., and/or alloys thereof. In yet more approaches, the orientation controlling intermediate layer 606 may include one or more face-centered cubic structure metals including but not limited to Pt, Pd, Ni, Au, Ag, Cu, etc., and/or alloys thereof. In further approaches, these materials suitable for use in the orientation controlling intermediate layer 606 may be combined in plurality to form a laminated-type orientation controlling intermediate layer 606.

As noted above, the magnetic recording layer 608 is present above the orientation controlling intermediate layer 606. The magnetic recording layer 608 includes a plurality of ferromagnetic grains 610 surrounded by non-magnetic grain boundaries 612. As shown in FIG. 6, the magnetic recording layer 608 has a granular structure in which the plurality of ferromagnetic grains 610 are separated from each other by the non-magnetic grain boundaries 612.

Each of the ferromagnetic grains 610 may have an average diameter, d, in the in-plane direction of the magnetic recording layer 608 of greater than 0 to less than or equal to about 14 nm. As discussed previously, one preferred way to increase the recording density is to reduce the size of the ferromagnetic crystal grains. For an aerial recording density in excess of 1 Tbit/inch$^2$, a linear recording density (the bits per inch along each recording track around the disk) between 1800 and 2000 kbit/inch may be achieved where the recording bit length is not larger than about 14 nm. Accordingly, when the preferred diameter of the ferromagnetic crystal grains in the in-plane direction of the magnetic recording layer exceeds 14 nm, a marked deterioration in the recording/reproducing characteristics may occur.

In various approaches, the thickness, t, of the magnetic recording layer may be about 6 nm or less, e.g., 3-5 nm, ideally about 4 nm.

In preferred approaches, the plurality of ferromagnetic grains 610 include an ordered alloy having a $L1_0$-type ordered structure. In more preferred approaches, this $L1_0$-type ordered alloy includes a Fe—X—Pt alloy, where X may be a material that is known to be substantially or completely soluble with Fe. It is important that X be substantially or completely solid soluble with Fe, such that substitution of an amount of Fe in a $L1_0$-type Fe—Pt ordered alloy with X results in the formation of a $L1_0$-type Fe—X—Pt ordered alloy without any loss to the order parameter in the $L1_0$-type structure.

In particular approaches, X may be Ni, as Ni is solid soluble with Fe and, similar to Fe, forms a $L1_0$-type ordered alloy with Pt. Accordingly, when an amount of Fe in a $L1_0$-type Fe—Pt ordered alloy is substituted for Ni, a $L1_0$-type Fe—Ni—Pt ordered alloy may be formed without any loss to the order parameter in the $L1_0$-type structure. Moreover, during exposure of the magnetic layer to a heated environment during and/or after its deposition to promote ordering of the Fe—Ni—Pt alloy therein, the comparatively larger diffusion coefficient of Ni with Pt relative to Ni with Fe encourages atomic diffusion and rearrangement in such a way as to suppress fluctuations in the composition and order parameter of each of the ferromagnetic crystal grains. Consequently, a magnetic recording layer including a $L1_0$-type Fe—Ni—Pt ordered alloy may ultimately have a reduced SFD and Curie point distribution as compared to an otherwise identical magnetic recording layer having a conventional $L1_0$-type Fe—Pt ordered alloy.

For the sake of clarity, X is assumed to be Ni for the remaining description of the $L1_0$-type Fe—X—Pt ordered alloy included in the ferromagnetic grains 610. It is important to note, however, that Ni is a non-limiting example of an element suitable for X.

The atomic percentage of Ni relative to the sum of the atomic percentages of Fe and Ni in the $L1_0$-type Fe—Ni—Pt ordered alloy may be represented by: Ni/(Fe+Ni). In various approaches, the ratio of Ni/(Fe+Ni) may be in a range between about 0.05 and about 0.3.

In more approaches, the amount of Pt in the $L1_0$-type Fe—Ni—Pt ordered alloy may be about 50 atomic percent (at. %). In yet more approaches, the sum of the atomic percentages of the Ni and Fe in the $L1_0$-type Fe—Ni—Pt ordered alloy may equal about 50 at. %. In further approaches, the $L1_0$-type Fe—Ni—Pt ordered alloy comprises about 50 at. % Pt, and about 50 at. % of Ni and Fe combined (($Fe-Ni)_{50}Pt_{50}$).

In additional approaches, the ferromagnetic grains 610 may include a $L1_0$-type Fe—Ni—Pt—Y ordered alloy, where Y includes a material that has a low melting point, e.g., within the range of the melting points of the exemplary materials listed in the next sentence. For example, Y may include, but is not limited to, Au, Ag and Cu. This element Y may be included in the ordered alloy in amounts effective to promote the ordering thereof.

As noted above, each of the ferromagnetic crystal grains 610 may be surrounded by non-magnetic crystal grain boundaries 612. In various approaches, the non-magnetic grain boundaries 612 may include the following non-metallic elements, singly or in combination: carbon (e.g., 15-30 vol. % of C based on a total volume of the magnetic recording layer), boron, oxides (e.g., $SiO_2$, $TiO_2$, MgO, $Ta_2O_5$, $Cr_2O_3$, $B_2O_3$, etc.), nitrides (e.g., SiN, TiN, CrN, BN, etc.), carbides (e.g., SiC, TiC, etc.) or other suitable non-metallic segregant material as would be understood by one having skill in the art upon reading the present disclosure. It has been found that in approaches where the ferromagnetic grains include a $L1_0$-type Fe—Ni—Pt—Y ordered alloy, non-metallic elements such as oxides, nitrides and/or carbides may be used to form suitable non-magnetic crystal grain boundaries without adversely affecting said ferromagnetic crystal grains, as would be typically expected due to presence of oxides, nitrides and/or carbides.

In preferred approaches, the non-magnetic crystal grain boundaries 612 may include one or more materials that have an overall smaller surface energy than the material of the ferromagnetic grains 610 (e.g. Fe, Ni and Pt). The surface energy difference between the ferromagnetic grains 610 and the non-magnetic crystal grain boundaries 612 results in a phase-separation and thus promotes granulation. Granulation may be further encouraged in more approaches where the magnetic recording layer 608 is exposed to a heat treatment configured to promote ordering of the alloy present therein. In various approaches, this heat treatment may correspond to the deposition of layers (e.g., underlayers, orientation controlling layers, magnetic recording layer(s)) on a pre-heated substrate and/or application of heat during and/or after deposition of the magnetic recording layer.

Moreover, in additional approaches the non-magnetic crystal grain boundaries 612 may include one or more materials that have a lower Gibbs free energy than the material of the ferromagnetic grains 610 (e.g. Fe, Ni and Pt). This difference in the Gibbs free energy between the ferromagnetic grains 610 and the non-magnetic crystal grain boundaries 612 may increase the likelihood of spontaneous granulation, which once it occurs, makes dissociation unlikely.

In some approaches, the magnetic medium 600 may also include two or more magnetic recording layers (not shown in FIG. 6). When two or more magnetic recording layers are present, the ferromagnetic grains 610 preferably extend through each of the magnetic recording layers substantially uniaxially. Additionally, when two or more magnetic recording layers are present, the ferromagnetic grains 610 in each magnetic recording layer may be separated by a segregant (i.e., non-magnetic crystal grain boundaries). The segregants in each of the magnetic recording layers may be the same or different from one another.

In particular approaches, the magnetic recording layer 608 may be a patterned magnetic recording layer. In patterned recording media, the ensemble of ferromagnetic grains that form a bit are replaced with a single isolated magnetic region, or island, that may be purposefully placed in a location where the write transducer expects to find the bit in order to write information and where the readback transducer expects to detect the information stored thereto. To reduce the magnetic moment between the isolated magnetic regions or islands in order to form the pattern, magnetic material is destroyed, removed or its magnetic moment substantially reduced or eliminated, leaving nonmagnetic regions therebetween. There are two types of patterned magnetic recording media: discrete track media (DTM) and bit patterned media (BPM). For DTM, the isolated magnetic regions form concentric data tracks of magnetic material, where the data tracks are radially separated from one another by concentric grooves of nonmagnetic material. In BPM, the isolated magnetic regions form individual bits or data islands which are isolated from one another by non-magnetic material/crystal grain boundaries (e.g. a segregant). Each bit or data island in BPM includes a single magnetic domain, which may be comprised of a single magnetic grain or a few strongly coupled grains that switch magnetic states in concert as a single magnetic volume.

With continued reference to FIG. 6, the magnetic medium 600 may include one or more optional capping layers 614 above the magnetic recording layer 608. The one or more capping layers 614 may be configured to mediate the intergranular coupling of the magnetic grains present in the magnetic recording layer 614. The one or more optional capping layers 614 may include, for example, a Co-, CoCr-, CoPtCr-, and/or CoPtCrB-based alloy, or other material suitable for use in a capping layer as could be recognized by one having skill in the art upon reading the present disclosure. In some approaches, a first high magnetic anisotropy ($K_u$) capping layer including an oxide may be positioned above the magnetic recording layer 608, and a second log $K_u$ capping layer may be positioned above the first capping layer.

As additionally shown in FIG. 6, a protective overcoat layer 616 may be positioned above the magnetic recording layer 608 and/or the one or more capping layers 614 if present. The protective overcoat layer 616 may be configured to protect the underlying layers from wear, corrosion, etc. This protective overcoat layer 932 may be made of, for example, diamond-like carbon, carbon nit de Si-nitride, BN or B4C, etc. or other such materials suitable for a protective overcoat as would be understood by one having skill in the art upon reading the present disclosure.

The magnetic recording medium 600 illustrated in FIG. 6 may also include a lubricant layer 618. The material of the lubricant layer 618 may include, but is not limited to perfluoropolyether, fluorinated alcohol, fluorinated carboxylic acids, etc., or other suitable lubricant material as known in the art.

EXAMPLES

The following non-limiting examples describe various embodiments of magnetic media disclosed herein, particularly those including a magnetic recording layer including a $L1_0$-type Fe—Ni—Pt ordered alloy. It is important to note that the following examples are for illustrative purposes only and do not limit the invention in anyway. It should also be understood that variations and modifications of these examples may be made by those skilled in the art without departing from the spirit and scope of the invention.

Example 1

The magnetic recording medium of Example 1 was prepared by depositing, via sputtering: a 100 nm Ni—Ta adhesion layer directly on and above a borosilicate glass substrate; a 12 nm MgO orientation controlling intermediate layer directly on and above the adhesion layer; a 4 nm Fe—Ni—Pt—C magnetic recording layer directly on and above the orientation controlling intermediate layer; and a 3 nm carbon nitride protective layer directly on and above the magnetic recording layer.

Regarding the atomic composition of the $L1_0$-type Fe—Ni—Pt ordered alloy in the magnetic recording layer, the atomic percentage of Pt was equivalent to the atomic percentage of Fe and Ni combined. Stated another way, the atomic composition of the $L1_0$-type Fe—Ni—Pt ordered alloy in the magnetic recording layer may be expressed as $(Fe-Ni)_{50}Pt_{50}$, indicating that the content of Pt in the ordered alloy was 50 at %, and the combined content of Fe and Ni was 50 at. %. In various approaches, the relative amounts of Fe and Ni were gradually changed, provided that the combined content of Fe and Ni remained at 50 at. %.

The magnetic recording layer also included 22 vol. % of C based on a total volume of the magnetic recording layer. The 22 vol. % of C was introduced thereto as a grain boundary material. Accordingly, the overall composition of the magnetic recording layer may be expressed as $(Fe-Ni)_{50}Pt_{50})$-22 vol. % C.

When the magnetic recording layer was deposited, ordering of the Fe—Ni—Pt alloy to form a $L1_0$-type Fe—Ni—Pt ordered alloy was caused by pre-heating the substrate to not less than 600° C. A minute amount of Ag was also added to the magnetic recording layer to promote the ordering. The results of a microstructural observation performed using an transmission electron microscope (TEM) revealed that, irrespective of the atomic ratio of Ni/(Fe+Ni), which corresponds to the at. % of Ni relative to the at. % of Ni and Fe combined, the magnetic recording layer included ferromagnetic crystal grains with an average diameter in the in-plane direction of about 10.5 nm. Moreover, it was found from the TEM images that the ferromagnetic crystal grain and crystal grain boundary modes were substantially the same.

Figure 7:
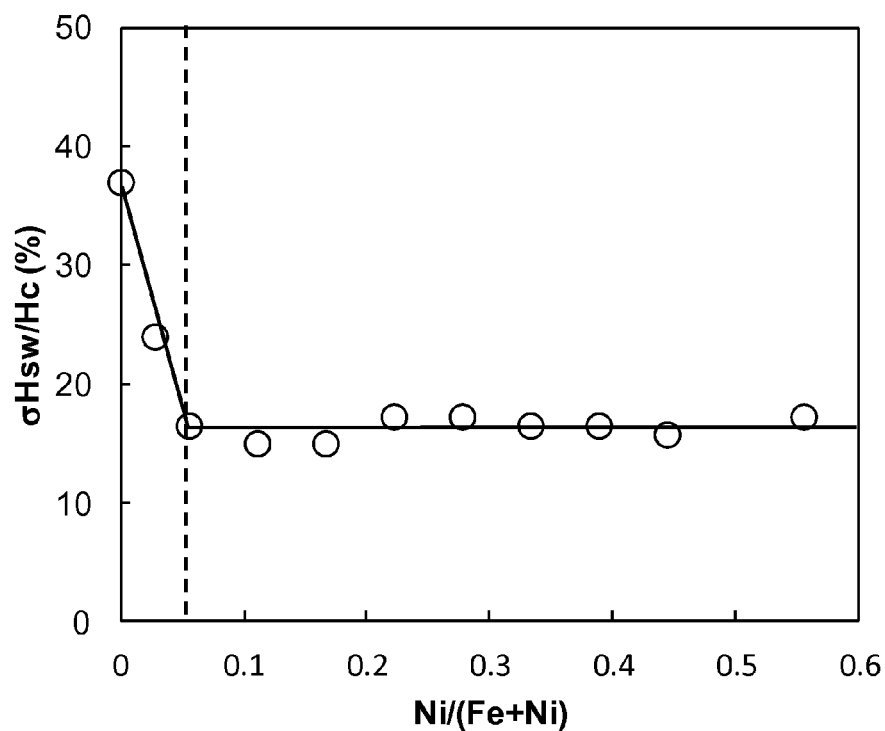
FIG. 7 is a plot of the switching field distribution (SFD) of a magnetic recording layer with a $L1_0$-type Fe—Ni—Pt ordered alloy included therein for varying Ni/(Fe+Ni) atomic ratios.
Figure 8:
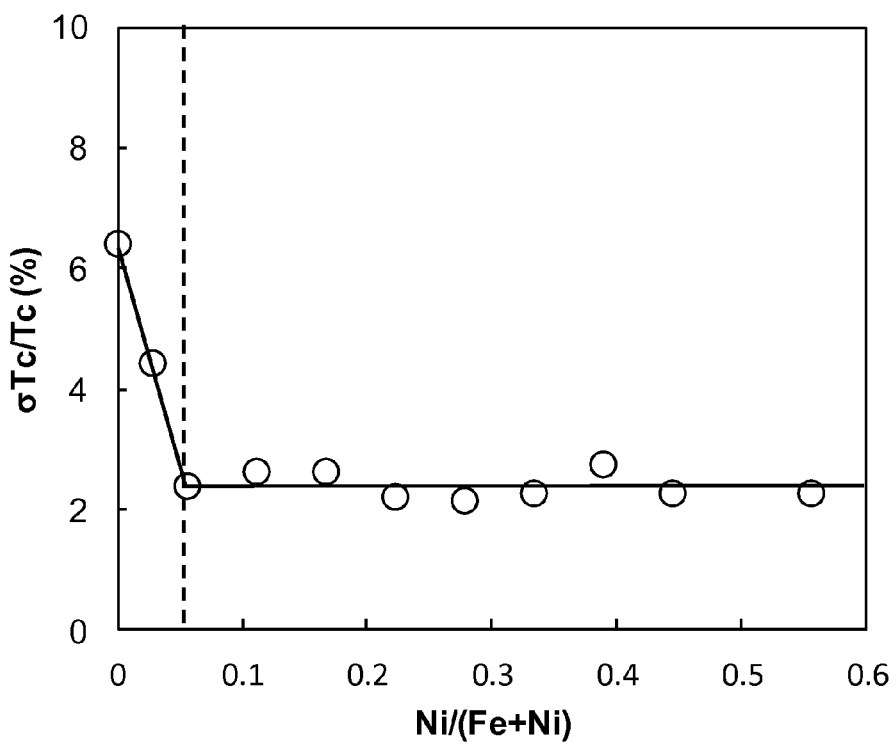
FIG. 8 is a plot of the Curie point distribution of a magnetic recording layer with a $L1_0$-type Fe—Ni—Pt ordered alloy included therein for varying Ni/(Fe+Ni) atomic ratios.

FIG. 7 shows a plot of the switching field distribution (SFD) of the magnetic recording layer with the $L1_0$-type Fe—Ni—Pt ordered alloy included therein for varying Ni/(Fe+Ni) atomic ratios. Additionally, FIG. 8 shows a plot of the Curie point distribution of the magnetic recording layer for varying Ni/(Fe+Ni) atomic ratios. As shown in FIGS. 7 and 8, when the Ni/(Fe+Ni) atomic ratio is zero (i.e., when the $L1_0$-type ordered alloy constituted only 50 at. % Pt and 50 at. % Fe, and no Ni), the SFD and Curie point distribution are large. Magnetic recording layers having $L1_0$-type Fe—Pt ordered alloys, typically seen in convention magnetic recording media, suffer from fluctuations in the order parameter and the composition of each of the ferromagnetic crystal grains and thus have a large SFD and Curie point distribution, which adversely affects magnetic recording/reproducing characteristics. However, as evidenced by FIGS. 7 and 8, the SFD and the Curie point distribution are immediately reduced by substituting a portion of the Fe content with Ni in the $L1_0$-type ordered alloy present in the magnetic recording layer. Moreover, as additionally shown in FIGS. 7 and 8, the SFD and the Curie point distribution remain constant at a Ni/(Fe+Ni) atomic ratio of 0.05 and greater.

Compared to conventional magnetic recording media, the SFD and the Curie point distribution are much smaller for the magnetic recording medium of Example 1 (and other described herein), particularly where the $L1_0$-type Fe—Ni—Pt ordered alloy of the magnetic recording layer has a Ni/(Fe+Ni) atomic ratio of about 0.5 or greater. Without wishing to be bound by any theory, it is thought that the diffusion coefficient of Ni with Pt is comparatively larger than the diffusion coefficient of Ni with Fe, thus promoting the atomic diffusion and rearrangement of the elements in the heating step for ordering, which in turn suppresses fluctuations in composition and order parameter of the ferromagnetic crystal grains.

Figure 9:
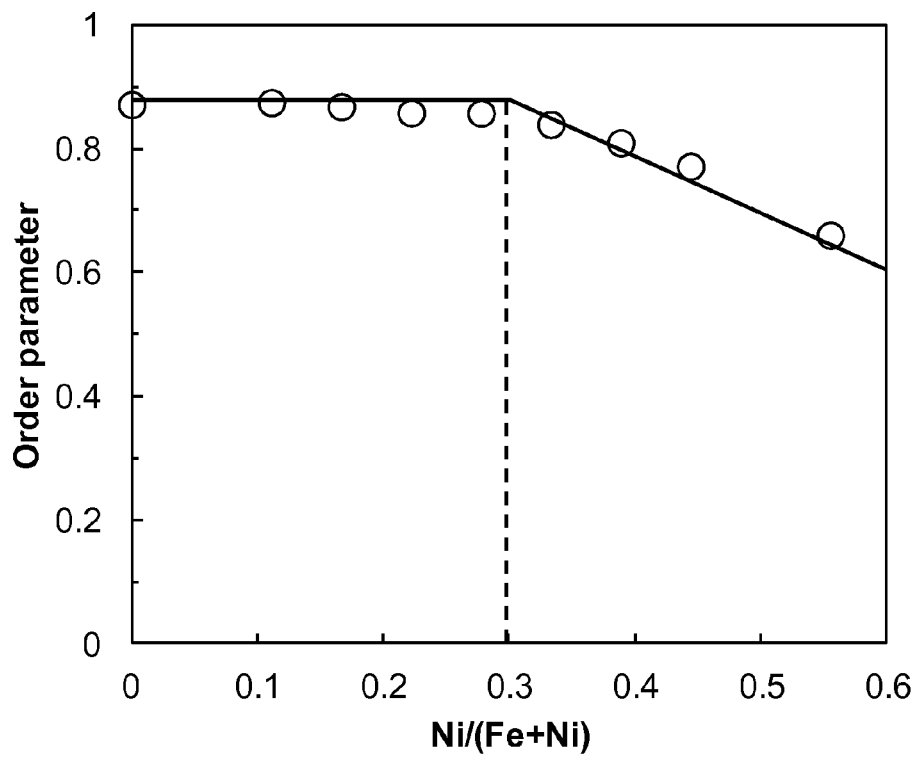
FIG. 9 a plot of the order parameter of the $L1_0$-type Fe—Ni—Pt ordered alloy in a magnetic recording layer for varying Ni/(Fe+Ni) atomic ratios.

FIG. 9 shows a plot of the order parameter of the $L1_0$-type Fe—Ni—Pt ordered alloy in the magnetic recording layer for varying Ni/(Fe+Ni) atomic ratios. As shown in FIG. 9, the magnetic recording medium exhibits a substantially constant, high order parameter for Ni/(Fe+Ni) atomic ratios between about 0 and about 0.3. For Ni/(Fe+Ni) atomic ratios greater than 0.3, the order parameter of the $L1_0$-type Fe—Ni—Pt ordered alloy comprised in the magnetic recording layer of the magnetic recording medium gradually drops. As described above, when a portion of Fe in a $L1_0$-type Fe—Pt ordered alloy is substituted with Ni, a Fe—Ni—Pt $L1_0$-type ordered alloy may be formed with no loss of the ordered structure. The ordered-disordered transition temperature (approximately 650° C.) of an alloy comprising Ni and Pt is less than the ordered-disordered transition temperature of an alloy comprising Fe and Pt (approximately 1300° C.). Accordingly, when an alloy comprising Ni and Pt is heated to a sufficient temperature to promote atomic diffusion and rearrangement for ordering, an $L1_0$-type ordered alloy, which represents the low-temperature phase, is less likely to exist stably. This is thought to one possible explanation as to why the order parameter the $L1_0$-type Fe—Ni—Pt ordered alloy gradually drops when the Ni/(Fe+Ni) atomic ratio is large. However, analysis of FIGS. 7-9 reveals that the magnetic recording layer including a $L1_0$-type Fe—Ni—Pt ordered alloy, where the Ni/(Fe+Ni) atomic ratio is between about 0.05 and 0.3, has a low SFD and Curie point distribution, as well as a high order parameter.

Figure 10:
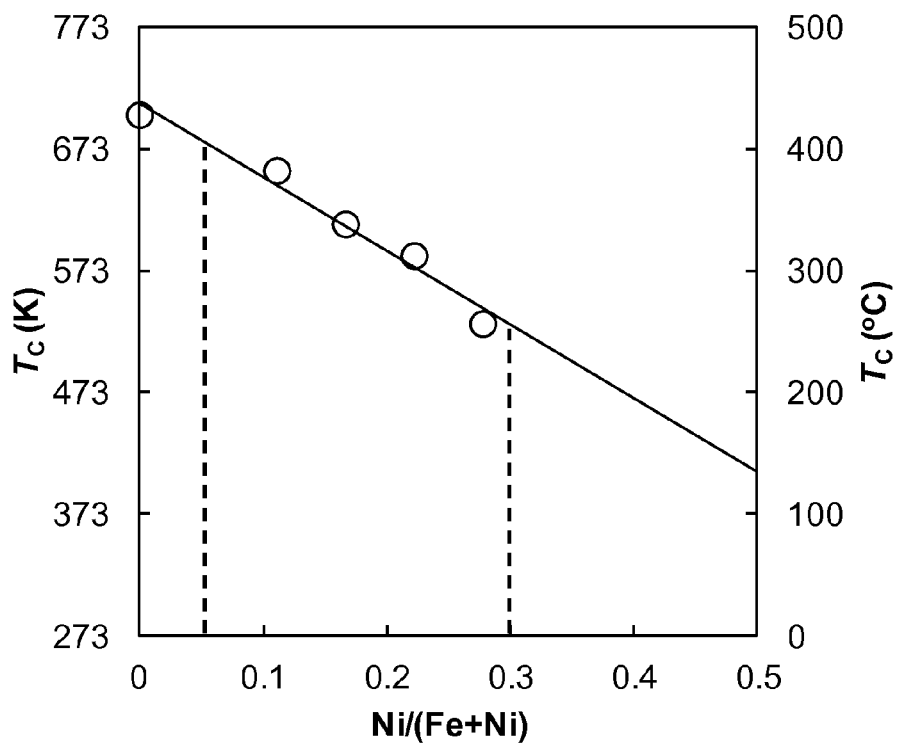
FIG. 10 is a plot of the Curie point of a magnetic recording layer with a $L1_0$-type Fe—Ni—Pt ordered alloy included therein for varying Ni/(Fe+Ni) atomic ratios.

FIG. 10 shows a plot of the Curie point of the magnetic recording layer with the $L1_0$-type Fe—Ni—Pt ordered alloy included therein for varying Ni/(Fe+Ni) atomic ratios. As shown in FIG. 10, the Curie point of the magnetic recording layer drops steadily for increasing Ni/(Fe+Ni) atomic ratios. The preferred Curie point of the magnetic recording layer for HAMR is between about 250° C. and about 400° C. Thus in approaches where the magnetic recording medium may be used for HAMR operations, the $L1_0$-type Fe—Ni—Pt ordered alloy preferably has a Ni/(Fe+Ni) atomic ratio between about 0.05 and about 0.3. Analysis of FIGS. 7-10 further reveals that the magnetic recording layer including a $L1_0$-type Fe—Ni—Pt ordered alloy, where the Ni/(Fe+Ni) atomic ratio is between about 0.05 and 0.3, has a low SFD and Curie point distribution, a high order parameter, and a Curie point particularly suited for HAMR.

It is important to note that the grain boundary material of the magnetic recording layer described in Example 2 is not limited to carbon, C. For example, various experiments were conducted in which the magnetic recording layer may comprised $(Fe-Ni)_{50}Pt_{50})$–22 vol. % X, where X (the grain boundary material) included at least one of: B, $SiO_2$, $TiO_2$, MgO, $Ta_2O_5$, $Cr_2O_3$, $B_2O_3$, SiN, TiN, CrN, BN, SiC and TiC. In such approaches where X included at least one of: B, $SiO_2$, $TiO_2$, MgO, $Ta_2O_5$, $Cr_2O_3$, $B_2O_3$, SiN, TiN, CrN, BN, SiC and TiC, the SFD, Curie point distribution, order parameter and Curie point of the magnetic recording layer for varying Ni/(Fe+Ni) atomic ratios was the same as that for the approaches where the grain boundary material was C (see e.g., FIGS. 7-10). Accordingly, a magnetic recording layer that includes $(Fe-Ni)_{50}Pt_{50})$–22 vol. % X, where X is at least one of: C, B, $SiO_2$, $TiO_2$, MgO, $Ta_2O_5$, $Cr_2O_3$, $B_2O_3$, SiN, TiN, CrN, BN, SiC and TiC, and where the Ni/(Fe+Ni) atomic ratio is between about 0.05 and about 0.3, has a low SFD and Curie point distribution, high order parameter and a Curie point particularly suited for HAMR.

Example 2

The magnetic recording medium of Example 2 was prepared by depositing, via sputtering: a 100 nm Ni—Ta adhesion layer directly on and above a borosilicate glass substrate; a 12 nm MgO orientation controlling intermediate layer directly on and above the adhesion layer; a 4 nm Fe—Ni—Pt—C magnetic recording layer directly on and above the orientation controlling intermediate layer; a 3 nm carbon nitride protective layer directly on and above the magnetic recording layer, and a lubricant layer directly on and above the protective layer.

Regarding the atomic composition of the $L1_0$-type Fe—Ni—Pt ordered alloy in the magnetic recording layer, the atomic percentage of Pt was equivalent to the atomic percentage of Fe and Ni combined. Stated another way, the atomic composition of the $L1_0$-type Fe—Ni—Pt ordered alloy in the magnetic recording layer may be expressed as $(Fe-Ni)_{50}Pt_{50}$, indicating that the content of Pt in the ordered alloy was 50 at %, and the combined content of Fe and Ni was 50 at. %. In various approaches, the relative amounts of Fe and Ni were gradually changed, provided that the combined content of Fe and Ni remained at 50 at. %.

The magnetic recording layer also included 22 vol. % of C based on a total volume of the magnetic recording layer. The 22 vol. % of C was introduced thereto as a grain boundary material. Accordingly, the overall composition of the magnetic recording layer may be expressed as $(Fe-Ni)_{50}Pt_{50}$)–22 vol. % C.

When the magnetic recording layer was deposited, ordering of the Fe—Ni—Pt alloy to form a $L1_0$-type Fe—Ni—Pt ordered alloy was caused by pre-heating the substrate to not less than 600° C. A minute amount of Ag was also added to the magnetic recording layer to promote the ordering. The results of a microstructural observation performed using an transmission electron microscope (TEM) revealed that, irrespective of the atomic ratio of Ni/(Fe+Ni), which corresponds to the at. % of Ni relative to the at. % of Ni and Fe combined, the magnetic recording layer included ferromagnetic crystal grains with an average diameter in the in-plane direction of about 10.5 nm. Moreover, it was found from the TEM images that the ferromagnetic crystal grain and crystal grain boundary modes were substantially the same.

A thermally-assisted recording head and spinstand was employed to record/reproduce data in the magnetic recording medium of Example 2 via a thermally assisted magnetic recording method. The thermally-assisted recording head included the typical magnetic poles and coils configured to generate the recording field and the magneto-resistance effect element configured to reproduce the magnetic signal. In additional, the thermally-assisted recording head included a heating mechanism configured to heat a localized region of the magnetic medium to facilitate the recording of magnetic signals thereto, wherein this heating mechanism included at least a laser diode, an optical waveguide, a mirror and a near-field light element. The laser output, laser irradiation time, coil current etc. was adjusted so as to achieve a constant 2000 kbpi (kilobytes per inch) linear recording density and a target 1 Tbit/inch$^2$ areal density. The relationship between the signal-to-noise ratio (SNR) and the track width was examined.

Figure 11:
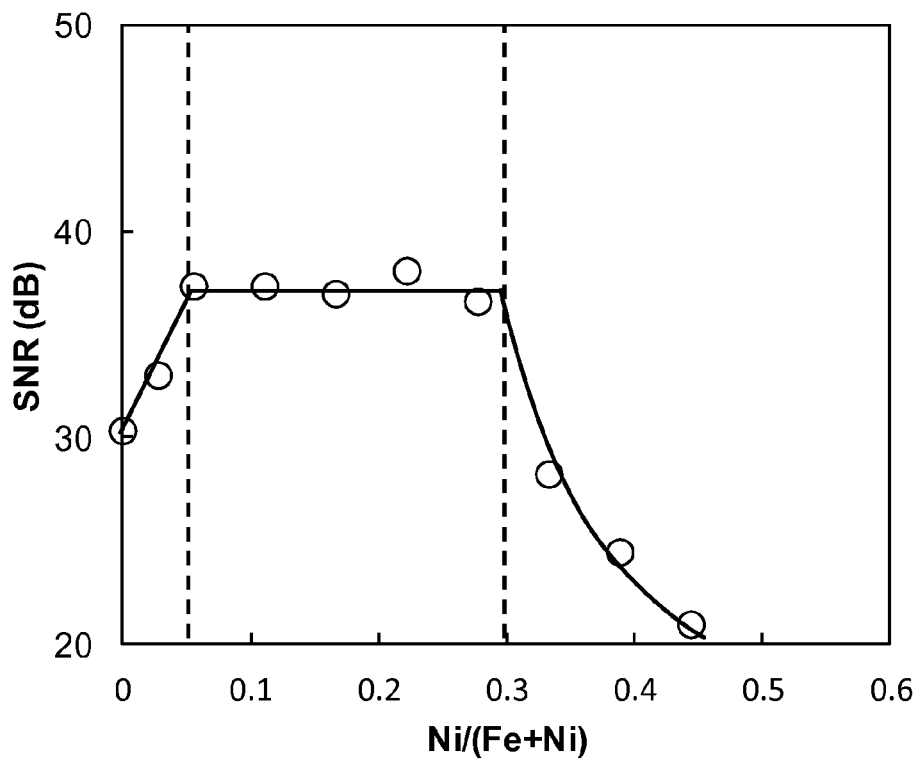
FIG. 11 is a plot of the signal to noise ratio (SNR) associated with a magnetic recording layer having a $L1_0$-type Fe—Ni—Pt ordered alloy included therein for varying Ni/(Fe+Ni) atomic ratios.

FIG. 11 shows a plot of the SNR of the magnetic recording medium having the magnetic recording layer with the $L1_0$-type Fe—Ni—Pt ordered alloy included therein for varying Ni/(Fe+Ni) atomic ratios. It is important to note that the track width is the same for each measured value of the SNR at the varying Ni/(Fe+Ni) atomic ratios. As shown in FIG. 11, the SNR increases with increasing Ni/(Fe+Ni) atomic ratios up to a Ni/(Fe+Ni) atomic ratio of about 0.05. Without wishing to be bound by any theory, this SNR increase is thought to correspond to a reduction in the SFD and the Curie point distribution that also accompanies an increase in the Ni/(Fe+Ni) atomic ratio from 0 to about 0.05. Moreover, it is also thought that the increase in the SNR for an increasing Ni/(Fe+Ni) atomic ratio up to about 0.05 may be due to the fact that the Curie point of the magnetic recording layer approaches the preferred value for thermally-assisted magnetic recording as the Ni/(Fe+Ni) atomic ratio increases.

As additionally shown in FIG. 11, the SNR remains substantially constant when the Ni/(Fe+Ni) atomic ratio is between about 0.05 and about 0.3. Over this particular Ni/(Fe+Ni) atomic ratio range, the superior recording/reproducing characteristics (as compared to conventional recording media including $L1_0$-type Fe—Pt ordered alloys) are thought to be attributable to the low SFD and Curie point distribution of the magnetic recording layer, the high order parameter of the magnetic recording layer and the preferred Curie point of the magnetic recording layer for thermally-assisted magnetic recording.

As further shown in FIG. 11, the SNR decreases when the Ni/(Fe+Ni) atomic ratio is greater than about 0.3. Again, without wishing to be bound by any theory, this decrease in SNR is thought to be due to write blurring and thermal fluctuations of the recording magnetization, which are attributable to an excessively low Curie point. In addition, for Ni/(Fe+Ni) atomic ratios greater than about 0.3, the deterioration in the recording/reproducing characteristics is thought to be due to the decrease in the order parameter and magnetic anisotropic energy, as well as the greater likelihood of thermal fluctuations of the recording magnetization.

In sum, when the Ni/(Fe+Ni) atomic ratio is between about 0.05 and about 0.3, the magnetic medium exhibits excellent recording/reproducing characteristics, which are likely due to the fact that the magnetic recording layer has a lowered SFD and Curie point, a substantially constant, high order parameter, and a preferred Curie point for thermally-assisted magnetic recording over this particular Ni/(Fe+Ni) atomic ratio range.

It is important to note that the grain boundary material of the magnetic recording layer described in Example 2 is not limited to carbon, C. For example, in various approaches, the magnetic recording layer comprised $(Fe-Ni)_{50}Pt_{50}$)–22 vol. % X, where X (the grain boundary material) included at least one of: B, $SiO_2$, $TiO_2$, MgO, $Ta_2O_5$, $Cr_2O_3$, $B_2O_3$, SiN, TiN, CrN, BN, SiC and TiC. In such approaches where X included at least one of: B, $SiO_2$, $TiO_2$, MgO, $Ta_2O_5$, $Cr_2O_3$, $B_2O_3$, SiN, TiN, CrN, BN, SiC and TiC, the relationship between the SNR (at a single track width) for varying Ni/(Fe+Ni) atomic ratios was the same as that for the approaches where the grain boundary material was C (see e.g., FIG. 11). Accordingly, a magnetic recording layer that includes $(Fe-Ni)_{50}Pt_{50}$)–22 vol. % X, where X is at least one of: C, B, $SiO_2$, $TiO_2$, MgO, $Ta_2O_5$, $Cr_2O_3$, $B_2O_3$, SiN, TiN, CrN, BN, SiC and TiC, and where the Ni/(Fe+Ni) atomic ratio is between about 0.05 and about 0.3, has a high and substantially constant SNR, which is thought to be attributable to the low SFD and Curie point distribution, the high order parameter, and the preferred Curie point of the magnetic recording layer for thermally-assisted magnetic recording over this particular Ni/(Fe+Ni) atomic ratio range.

Example 3

The magnetic recording medium of Example 3 was prepared by depositing, via sputtering: a 100 nm Ni—Ta adhesion layer directly on and above a borosilicate glass substrate; a 12 nm MgO orientation controlling intermediate layer directly on and above the adhesion layer; a 4 nm Fe—Ni—Pt—C magnetic recording layer directly on and above the orientation controlling intermediate layer; and a 3 nm carbon nitride protective layer directly on and above the magnetic recording layer.

Regarding the atomic composition of the $L1_0$-type Fe—Ni—Pt ordered alloy in the magnetic recording layer, the atomic percentage of Pt was equivalent to the atomic percentage of Fe and Ni combined. Stated another way, the atomic composition of the $L1_0$-type Fe—Ni—Pt ordered alloy in the magnetic recording layer may be expressed as $(Fe-Ni)_{50}Pt_{50}$, indicating that the content of Pt in the ordered alloy was 50 at %, and the combined content of Fe and Ni was 50 at. %. The Ni/(Fe+Ni) atomic ratio was set at 0.16; thus, the $L1_0$-type Fe—Ni—Pt ordered alloy included 50 at. % Pt, 8 at. % Ni and 42 at. % Fe.

When the magnetic recording layer was deposited, ordering of the Fe—Ni—Pt alloy to form a $L1_0$-type Fe—Ni—Pt ordered alloy was caused by pre-heating the substrate to not less than 600° C. A minute amount of Ag was also added to the magnetic recording layer to promote the ordering.

The magnetic recording layer also included C as a grain boundary material. In various approaches, the vol. % of C in the magnetic recording layer (where the vol. % is based on a total volume of the magnetic recording layer) was varied. The results of a microstructural observation performed using an transmission electron microscope (TEM) revealed that an increase in the volume content of C resulted in a decrease in the average diameter of the ferromagnetic crystal grains in the in-plane direction of the magnetic recording layer.

A thermally-assisted recording head and spinstand was again employed to record/reproduce data in the magnetic recording medium of Example 3 via a thermally assisted magnetic recording method. The thermally-assisted recording head included the typical magnetic poles and coils configured to generate the recording field and the magneto-resistance effect element configured to reproduce the magnetic signal. In additional, the thermally-assisted recording head included a heating mechanism configured to heat a localized region of the magnetic medium to facilitate the recording of magnetic signals thereto, wherein this heating mechanism included at least a laser diode, an optical waveguide, a mirror and a near-field light element. The laser output, laser irradiation time, coil current etc. was adjusted so as to achieve a constant 2000 kbpi (kilobytes per inch) linear recording density and a target 1 Tbit/inch$^2$ areal density. The relationship between the signal-to-noise ratio (SNR) and the track width was examined.

Figure 12:
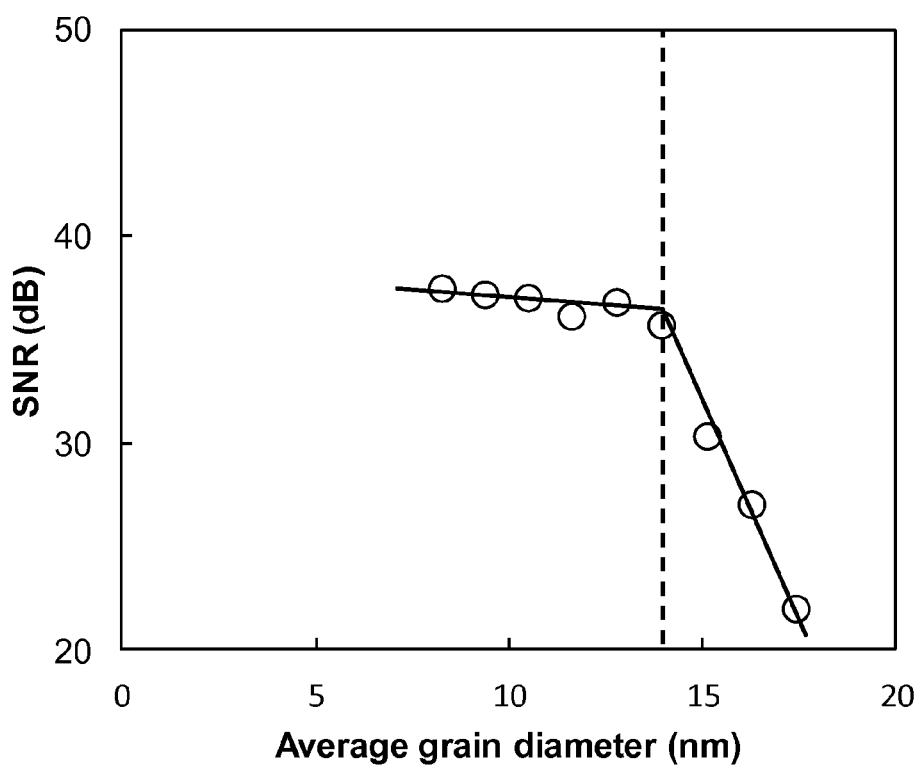
FIG. 12 a plot of the SNR associated with a magnetic recording layer for varying average grain diameters.

FIG. 12 shows a plot of the SNR of the magnetic recording medium for varying average grain diameters. It is important to note that the track width is the same for each measured value of the SNR at the varying average grain diameters. As shown in FIG. 12, the SNR decreases with increasing average grain diameter. More particularly, when the average grain diameter exceeds 14 nm, the SNR decreases rapidly. Accordingly, for high-density recording in excess of 1 Tbit/inch$^2$, the average diameter of the ferromagnetic crystal grains in the in-plane direction of the magnetic recording layer is preferably not more than 14 nm.

As discussed previously, an inherent problem associated with magnetic recording layers with conventional ordered alloys (e.g. $L1_0$-type Fe—Pt ordered alloys) involves the fluctuations in composition and order parameter of the ferromagnetic crystal grains, which in turn leads to a marked increase in the SFD and Curie point distribution, and thus a lower SNR, in the magnetic recording layer. This problem is particularly marked when the size of the ferromagnetic crystal grains is reduced. However, notably, when the average ferromagnetic grain diameter exceeds 14 nm, even if the Ni/(Fe+Ni) ratio is zero, the SFD and the Curie point distribution are not necessarily increased.

Example 4

The magnetic recording medium of Example 4 was prepared by depositing, via sputtering: a 70 nm Ni—Ta adhesion layer directly on and above a borosilicate glass substrate; a 30 nm Fe—Co—Ta—Zr soft magnetic underlayer directly on and above the adhesion layer, a 12 nm MgO orientation controlling intermediate layer directly on and above the soft magnetic underlayer; a 4 nm Fe—Ni—Pt—X magnetic recording layer directly on and above the orientation controlling intermediate layer, where X is the grain boundary material; and a 3 nm carbon nitride protective layer directly on and above the magnetic recording layer.

Regarding the atomic composition of the $L1_0$-type Fe—Ni—Pt ordered alloy in the magnetic recording layer, the atomic percentage of Pt was equivalent to the atomic percentage of Fe and Ni combined. Stated another way, the atomic composition of the $L1_0$-type Fe—Ni—Pt ordered alloy in the magnetic recording layer may be expressed as $(Fe-Ni)_{50}Pt_{50}$, indicating that the content of Pt in the ordered alloy was 50 at %, and the combined content of Fe and Ni was 50 at. %. In various approaches, the relative amounts of Fe and Ni were gradually changed, provided that the combined content of Fe and Ni remained at 50 at. %.

The magnetic recording layer also included 22 vol. % of X based on a total volume of the magnetic recording layer, where X is the grain boundary material. In various approaches, X included at least one of: C, B, $SiO_2$, $TiO_2$, MgO, $Ta_2O_5$, $Cr_2O_3$, $B_2O_3$, SiN, TiN, CrN, BN, SiC and TiC.

When the magnetic recording layer was deposited, ordering of the Fe—Ni—Pt alloy to form a $L1_0$-type Fe—Ni—Pt ordered alloy was caused by pre-heating the substrate to not less than 600° C. A minute amount of Ag was also added to the magnetic recording layer to promote the ordering. The results of a microstructural observation performed using an transmission electron microscope (TEM) revealed that, irrespective of the atomic ratio of Ni/(Fe+Ni), which corresponds to the at. % of Ni relative to the at. % of Ni and Fe combined, the magnetic recording layer included ferromagnetic crystal grains with an average diameter in the in-plane direction of about 10.5 nm. Moreover, it was found from the TEM images that the ferromagnetic crystal grain and crystal grain boundary modes were substantially the same.

A thermally-assisted recording head and spinstand was employed to record/reproduce data in the magnetic recording medium of Example 4 via a thermally assisted magnetic recording method. The thermally-assisted recording head included the typical magnetic poles and coils configured to generate the recording field and the magneto-resistance effect element configured to reproduce the magnetic signal. In additional, the thermally-assisted recording head included a heating mechanism configured to heat a localized region of the magnetic medium to facilitate the recording of magnetic signals thereto, wherein this heating mechanism included at least a laser diode, an optical waveguide, a mirror and a near-field light element. The laser output, laser irradiation time, coil current etc. was adjusted so as to achieve a constant 2000 kbpi (kilobytes per inch) linear recording density and a target 1 Tbit/inch$^2$ areal density.

It was found that similar to the results exhibited by the magnetic recording medium of Example 2 (see e.g., FIG. 11), the SNR (at a single track width) for the magnetic recording medium of Example 4 increased with increasing Ni/(Fe+Ni) atomic ratios up to a Ni/(Fe+Ni) atomic ratio of about 0.05 and decreased for Ni/(Fe+Ni) atomic ratios greater than about 0.3. Moreover, similar to the results exhibited by the magnetic recording medium of Example 2 (see e.g., FIG. 11), the SNR (at a single track width) for the magnetic recording medium of Example 4 remained substantially constant for Ni/(Fe+Ni) atomic ratios between about 0.05 and about 0.3. However, for Ni/(Fe+Ni) atomic ratios between about 0.05 and about 0.3, the SNR (at a single track width) of the magnetic recording medium of Example 4, while constant, was higher as compared the SNR of the magnetic recording medium of Example 2 at the same track width.

Without wishing to be bound by a particular theory, it is thought that the presence of the soft magnetic underlayer in the magnetic recording layer of Example 4 may be at least in part responsible for the constant, and comparatively higher SNR relative to that of the magnetic recording medium of Example 2 for Ni/(Fe+Ni) atomic ratios between about 0.05 and about 0.3. A soft magnetic underlayer, which preferably possesses a high saturated magnetic flux density and magnetic permeability, helps to focus the magnetic flux from the recording head into the magnetic recording layer in a direction generally perpendicular to the surface of the magnetic medium, thereby producing a sharp perpendicular recording field in the magnetic recording layer. Accordingly, incorporation of the soft magnetic recording layer in the magnetic medium of Example 4 may lead a better recording/reproducing performance as compared to the magnetic recording medium of Example 2, which does not possess a soft magnetic underlayer.

Example 5

The magnetic recording medium of Example 5 was prepared by depositing, via sputtering: a 70 nm Ni—Ta adhesion layer directly on and above a borosilicate glass substrate; a 30 nm Cu—Zr soft heat-absorbing layer directly on and above the adhesion layer, a 12 nm MgO orientation controlling intermediate layer directly on and above the soft heat-absorbing; a 4 nm Fe—Ni—Pt—X magnetic recording layer directly on and above the orientation controlling intermediate layer, where X is the grain boundary material; and a 3 nm carbon nitride protective layer directly on and above the magnetic recording layer.

Regarding the atomic composition of the $L1_0$-type Fe—Ni—Pt ordered alloy in the magnetic recording layer, the atomic percentage of Pt was equivalent to the atomic percentage of Fe and Ni combined. Stated another way, the atomic composition of the $L1_0$-type Fe—Ni—Pt ordered alloy in the magnetic recording layer may be expressed as $(Fe-Ni)_{50}Pt_{50}$, indicating that the content of Pt in the ordered alloy was 50 at %, and the combined content of Fe and Ni was 50 at. %. In various approaches, the relative amounts of Fe and Ni were gradually changed, provided that the combined content of Fe and Ni remained at 50 at. %.

The magnetic recording layer also included 22 vol. % of X based on a total volume of the magnetic recording layer, where X is the grain boundary material. In various approaches, X included at least one of: C, B, $SiO_2$, $TiO_2$, MgO, $Ta_2O_5$, $Cr_2O_3$, $B_2O_3$, SiN, TiN, CrN, BN, SiC and TiC.

When the magnetic recording layer was deposited, ordering of the Fe—Ni—Pt alloy to form a $L1_0$-type Fe—Ni—Pt ordered alloy was caused by pre-heating the substrate to not less than 600° C. A minute amount of Ag was also added to the magnetic recording layer to promote the ordering. The results of a microstructural observation performed using an transmission electron microscope (TEM) revealed that, irrespective of the atomic ratio of Ni/(Fe+Ni), which corresponds to the at. % of Ni relative to the at. % of Ni and Fe combined, the magnetic recording layer included ferromagnetic crystal grains with an average diameter in the in-plane direction of about 10.5 nm. Moreover, it was found from the TEM images that the ferromagnetic crystal grain and crystal grain boundary modes were substantially the same.

A thermally-assisted recording head and spinstand was employed to record/reproduce data in the magnetic recording medium of Example 5 via a thermally assisted magnetic recording method. The thermally-assisted recording head included the typical magnetic poles and coils configured to generate the recording field and the magneto-resistance effect element configured to reproduce the magnetic signal. In additional, the thermally-assisted recording head included a heating mechanism configured to heat a localized region of the magnetic medium to facilitate the recording of magnetic signals thereto, wherein this heating mechanism included at least a laser diode, an optical waveguide, a mirror and a near-field light element. The laser output, laser irradiation time, coil current etc. was adjusted so as to achieve a constant 2000 kbpi (kilobytes per inch) linear recording density and a target 1 Tbit/inch$^2$ areal density.

It was found that similar to the results exhibited by the magnetic recording medium of Example 2 (see e.g., FIG. 11), the SNR (at a single track width) for the magnetic recording medium of Example 5 increased with increasing Ni/(Fe+Ni) atomic ratios up to a Ni/(Fe+Ni) atomic ratio of about 0.05 and decreased for Ni/(Fe+Ni) atomic ratios greater than about 0.3. Moreover, similar to the results exhibited by the magnetic recording medium of Example 2 (see e.g., FIG. 11), the SNR (at a single track width) for the magnetic recording medium of Example 5 remained substantially constant for Ni/(Fe+Ni) atomic ratios between about 0.05 and about 0.3. However, for Ni/(Fe+Ni) atomic ratios between about 0.05 and about 0.3, the SNR (at a single track width) of the magnetic recording medium of Example 5, while constant, was higher as compared the SNR of the magnetic recording medium of Example 2 at the same track width.

Without wishing to be bound by a particular theory, it is thought that the presence of the soft heat-absorbing layer in the magnetic recording layer of Example 5 may be at least in part responsible for the constant, and comparatively higher SNR relative to that of the magnetic recording medium of Example 2 for Ni/(Fe+Ni) atomic ratios between about 0.05 and about 0.3. In a thermally-assisted magnetic recording method, the sharpness of the magnetization switching of a magnetic recording layer is affected by not only the gradient of the recording field from the head, but also the temperature time gradient. A heat-absorbing layer, which preferably possesses a high thermal conductivity, may promote heat dissipation in the magnetic recording layer, as well as increase the speed of the temperature rise and temperature fall in the magnetic recording layer at the start of heating and the completion of heating, respectively. Thus, the present of a heat-absorbing layer below a magnetic recording layer may increase the sharpness of the magnetization therein. As such, incorporation of the soft heat-absorbing layer in the magnetic medium of Example 5 may lead a better recording/reproducing performance as compared to the magnetic recording medium of Example 2, which does not possess a soft heat-absorbing layer.

It is important to note that in various approaches the magnetic media described herein may include a soft magnetic underlayer and/or a soft heat-absorbing layer. In particular approaches, the magnetic media described herein may include both a soft magnetic underlayer and a soft heat-absorbing layer. In approaches where both a soft magnetic underlayer and a soft heat-absorbing layer are present, the soft magnetic underlayer may be positioned above or below the soft heat absorbing layer, as equivalent effects may be provided regardless of the position of the soft magnetic underlayer relative to the heat-absorbing layer. In more approaches, a single layer positioned above the substrate and below the magnetic recording layer may include a material configured to function as a soft magnetic underlayer and a heat-absorbing layer (e.g., the material may possesses a high thermal conductivity, a high saturated magnetic flux density and/or magnetic permeability). In yet more approaches, the adhesion layer and/or an orientation controlling intermediate layer may include a material configured to also function as a soft magnetic underlayer and a heat-absorbing layer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

It should also be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic medium, comprising:
a substrate; and
a magnetic recording layer positioned above the substrate, the magnetic recording layer comprising an ordered alloy having a $L1_0$-type structure,
wherein the ordered alloy comprises a plurality of ferromagnetic crystal grains surrounded by non-magnetic grain boundaries,
wherein the ordered alloy comprises Fe, Ni and Pt,
wherein the ordered alloy has an atomic ratio of Ni/(Ni+Fe) in a range between about 0.05 to about 0.3,
wherein the magnetic recording layer comprises 15-30 vol. % of carbon based on a total volume of the magnetic recording layer.

2. The magnetic medium as recited in claim 1, wherein an amount of Pt in the ordered alloy is about 50 atomic percent.

3. The magnetic medium as recited in claim 1, wherein a combined amount of the Ni and Fe in the ordered alloy is about 50 atomic percent.

4. The magnetic medium as recited in claim 1, wherein each of the plurality of ferromagnetic grains has an average diameter in the in-plane direction of the magnetic recording layer of greater than 0 to less than or equal to about 14 nm.

5. The magnetic medium as recited in claim 1, wherein the ordered alloy further comprises Au.

6. The magnetic medium as recited in claim 1, wherein a total thickness of the magnetic recording layer is about 3 to 5 nm.

7. The magnetic medium as recited in claim 1, wherein each of the plurality of ferromagnetic grains has an average diameter in the in-plane direction of the magnetic recording layer of less than 6 nm.

8. The magnetic medium as recited in claim 1, further comprising a heat absorbing layer between the substrate and the magnetic recording layer.

9. The magnetic medium as recited in claim 1, wherein the non-magnetic grain boundaries comprise a material selected from a group consisting of SiC and TiC.

10. The magnetic medium as recited in claim 1, wherein the non-magnetic grain boundaries comprise a non-metallic material.

11. The magnetic medium as recited in claim 10, wherein the non-metallic material comprises at least one of boron, a nitride, and a carbide.

12. The magnetic medium as recited in claim 10, wherein the non-metallic material is selected from a group consisting of $SiO_2$, $TiO_2$, MgO, $Ta_2O_5$, $Cr_2O_3$, $B_2O_3$, SiN, TiN, CrN, BN, SiC and TiC.

13. The magnetic medium as recited in claim 10, wherein the non-metallic material is selected from a group consisting of $B_2O_3$, SiN, TiN, CrN, BN, SiC and TiC.

14. A magnetic data storage system, comprising:
at least one magnetic head;
a magnetic medium as recited in claim 1;
a drive mechanism for passing the magnetic medium over the at least one magnetic head; and
a controller electrically coupled to the at least one magnetic head for controlling operation of the at least one magnetic head.

15. A magnetic medium, comprising:
a substrate; and
a magnetic recording layer positioned above the substrate, the magnetic recording layer comprising an ordered alloy having a $L1_0$-type structure,
wherein the ordered alloy comprises a plurality of ferromagnetic crystal grains surrounded by non-magnetic grain boundaries,
wherein the ordered alloy comprises Fe, Ni and Pt,
wherein the ordered alloy has an atomic ratio of Ni/(Ni+Fe) in a range between about 0.05 to about 0.3,
wherein the non-magnetic grain boundaries comprise a non-metallic material,
wherein an amount of the non-metallic material in the ordered alloy is about 22 volume percent of carbon.

16. A magnetic medium, comprising:
a substrate; and
a magnetic recording layer positioned above the substrate, the magnetic recording layer comprising an ordered alloy having a $L1_0$-type structure,
wherein the ordered alloy comprises a plurality of ferromagnetic crystal grains surrounded by non-magnetic grain boundaries,
wherein the ordered alloy comprises Fe, Ni and Pt,
wherein the ordered alloy has an atomic ratio of Ni/(Ni+Fe) in a range between about 0.05 to about 0.3,
wherein the non-magnetic grain boundaries comprise a non-metallic material selected from a group consisting of $B_2O_3$, SiN, TiN, CrN, BN, SiC and TiC,
wherein a total thickness of the magnetic recording layer is less than about 5 nm,
wherein the magnetic recording layer comprises 15-30 vol. % of carbon based on a total volume of the magnetic recording layer.

17. The magnetic medium as recited in claim 16, wherein the ordered alloy further comprises at least one of Au and Cu, wherein the non-metallic material is selected from a group consisting of SiC and TiC, wherein an amount of the non-metallic material in the ordered alloy is about 22 volume percent.

* * * * *